(12) United States Patent
Fukui et al.

(10) Patent No.: US 12,485,828 B2
(45) Date of Patent: Dec. 2, 2025

(54) CONSOLE BOX

(71) Applicant: TOYODA GOSEI CO., LTD., Kiyosu (JP)

(72) Inventors: Naoyuki Fukui, Kiyosu (JP); Yu Hishida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 384 days.

(21) Appl. No.: 18/326,160

(22) Filed: May 31, 2023

(65) Prior Publication Data

US 2023/0415657 A1 Dec. 28, 2023

(30) Foreign Application Priority Data

Jun. 24, 2022 (JP) ................................. 2022-101937

(51) Int. Cl.
*B60R 7/04* (2006.01)
*E05B 83/32* (2014.01)

(52) U.S. Cl.
CPC ................ *B60R 7/04* (2013.01); *E05B 83/32* (2013.01)

(58) Field of Classification Search
CPC ............ E05B 83/32; B60R 7/005; B60R 7/08
See application file for complete search history.

(56) References Cited

U.S. PATENT DOCUMENTS

| | | | |
|---|---|---|---|
| 12,370,954 B2 * | 7/2025 | Fukui | B60R 7/04 |
| 2020/0156552 A1 * | 5/2020 | Yoshida | B60N 2/793 |
| 2023/0014176 A1 * | 1/2023 | Izume | E05C 19/02 |
| 2023/0136714 A1 * | 5/2023 | Fukui | B60R 7/04 296/24.34 |
| 2023/0415657 A1 * | 12/2023 | Fukui | E05B 83/32 |
| 2024/0001856 A1 * | 1/2024 | Fukui | E05C 9/045 |
| 2024/0067096 A1 * | 2/2024 | Fukui | B60R 7/04 |
| 2025/0083609 A1 * | 3/2025 | Lee | E05B 83/32 |

FOREIGN PATENT DOCUMENTS

| | | | |
|---|---|---|---|
| JP | 2020-082926 A | 6/2020 |
| JP | 2023-070037 A | 5/2023 |

\* cited by examiner

*Primary Examiner* — Aaron L Lembo
(74) *Attorney, Agent, or Firm* — Posz Law Group, PLC

(57) ABSTRACT

A console box includes a box main body, a lid, a lock mechanism, and at least one push-up mechanism. The push-up mechanism includes at least one recess that opens in a side surface of the lid, a striker, and an urging member that urges the striker in an urged pivoting direction. The striker includes a first push-up portion and a second push-up portion. The second push-up portion is located on a trailing side of the first push-up portion in the urged pivoting direction, is separated downward from a lower surface of the lid in the closed state, and is brought into contact with the lower surface to apply a push-up force to the lower surface after a push-up action by the first push-up portion.

5 Claims, 12 Drawing Sheets

CONSOLE BOX

BACKGROUND

1. Field

The present disclosure relates to a console box.

2. Description of Related Art

For example, Japanese Laid-Open Patent Publication No. 2020-82926 discloses a console box that includes a box main body provided with an accommodation portion, and a lid that opens and closes an upper opening of the accommodation portion. In this console box, when the upper opening is closed by the lid, one surface in the thickness direction of the lid faces upward.

In recent years, there has been a demand for a console box that can close the upper opening with the lid while allowing not only one surface but also the other surface in the thickness direction of the lid to face upward. In other words, there has been a demand for a console box that can close the upper opening regardless of which one of the surfaces in the thickness direction of the lid faces upward.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a console box includes a box main body that includes an accommodation portion provided with an upper opening, a lid that is detachably coupled to the box main body, and opens and closes the upper opening, a lock mechanism that locks the lid in a state in which the lid closes the upper opening, and at least one push-up mechanism that pushes up the lid from the box main body in response to unlocking of the lid by the lock mechanism. The box main body and the lid have shapes that allow the lid to be detached from and coupled to the box main body regardless of which one of surfaces in a thickness direction of the lid faces upward. The push-up mechanism includes at least one recess that opens in a side surface of the lid, a striker pivotally supported by the box main body with a shaft, and an urging member that urges the striker in an urged pivoting direction in which the lid is pushed up. A portion of the lid that includes at least one of the surfaces in the thickness direction is formed to be softer than the striker. The striker includes a first push-up portion and a second push-up portion. The first push-up portion enters the recess in a closed state in which the upper opening is closed by the lid, is removed from the recess as the lid is raised, and applies a push-up force to an inner wall surface of the recess when the first push-up portion is inside the recess. The second push-up portion is located on a trailing side in the urged pivoting direction of the first push-up portion, is separated downward from a lower surface of the lid in the closed state, and is brought into contact with the lower surface to apply a push-up force to the lower surface after a push-up action by the first push-up portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A console box according to one embodiment will now be described with reference to the drawings.

In the following description, the direction in which the vehicle advances forward will be referred to as the front, and the reverse direction will be referred to as the rear. The vertical direction refers to the vertical direction of the vehicle, and the left-right direction refers to the vehicle width direction that agrees with the left-right direction when the vehicle is advancing forward.

In order to identify positions in the console box in each of the front-rear direction, the vertical direction, and the left-right direction, a central portion of the console box in each direction is used as a reference. Among the respective directions, the direction, the side, or the like toward the central portion is referred to as "inside", "inward", "inner side", or the like, and the direction, the side, or the like away from the central portion is referred to as "outside", "outward", "outer side", or the like.

Figure 1:
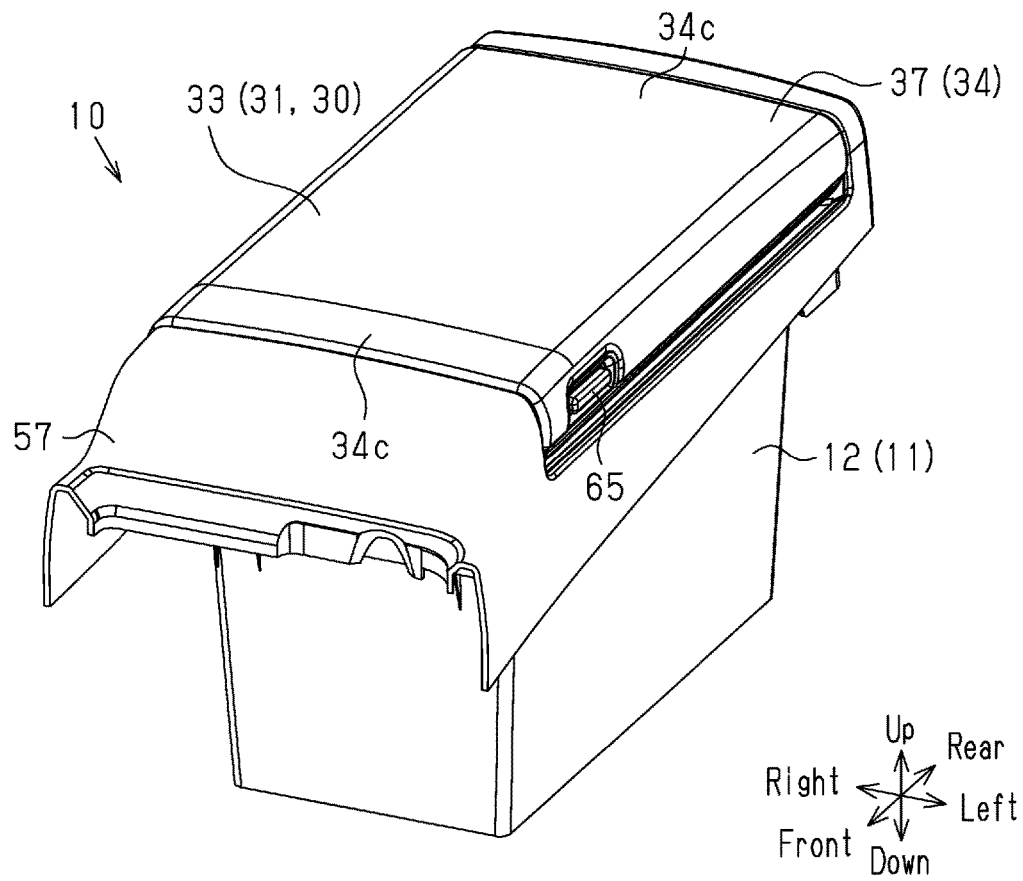
FIG. 1 is a perspective view showing a main part of a console box according to one embodiment.

FIG. 1 shows a main part of a console box 10. The console box 10 is part of a center console disposed between a driver's seat and a front passenger seat in a passenger compartment.

Figure 6:
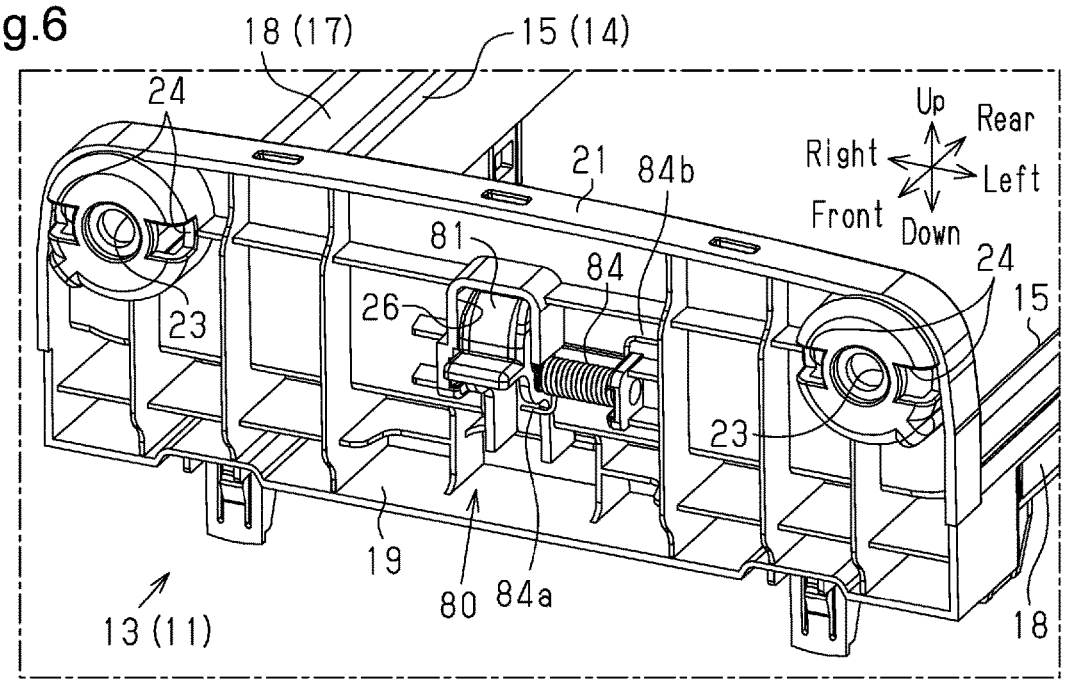
FIG. 6 is a partial perspective view illustrating a state in which a striker and a third spring are attached to a support wall portion on a front side according to the embodiment.

The console box 10 includes a box main body 11, a lid 30, a housing 57, lock mechanisms 60 (see FIG. 11), pivot range defining portions 78 (see FIG. 13), and push-up mechanisms 80 (see FIG. 6). Next, each component of the console box 10 will be described.

<Box Main Body 11>

Figure 2:
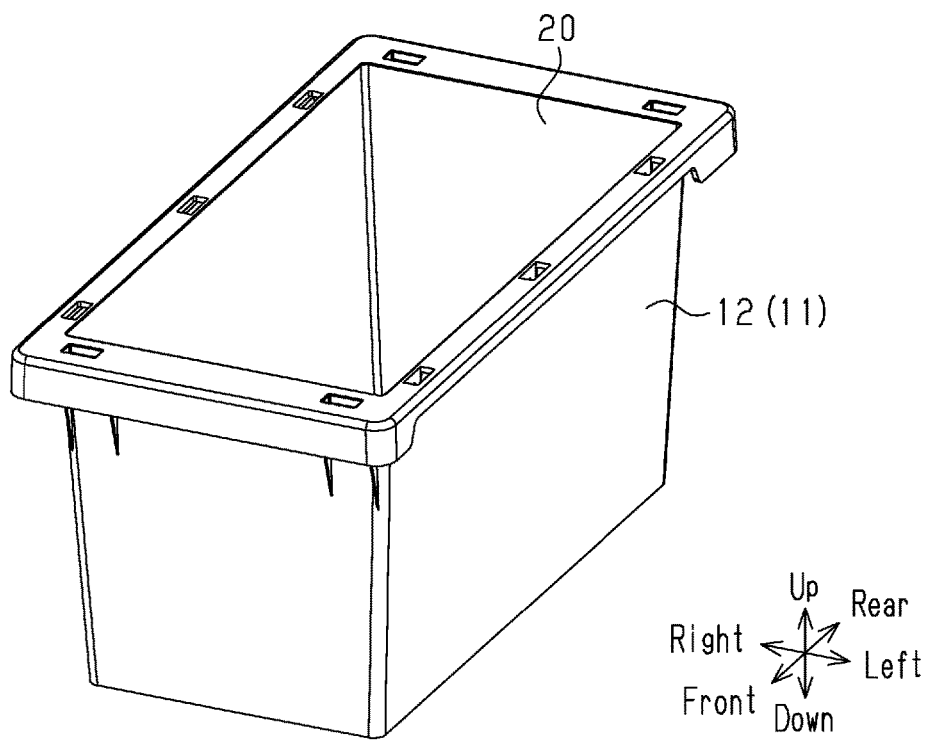
FIG. 2 is a perspective view of a box portion according to the embodiment.
Figure 3:
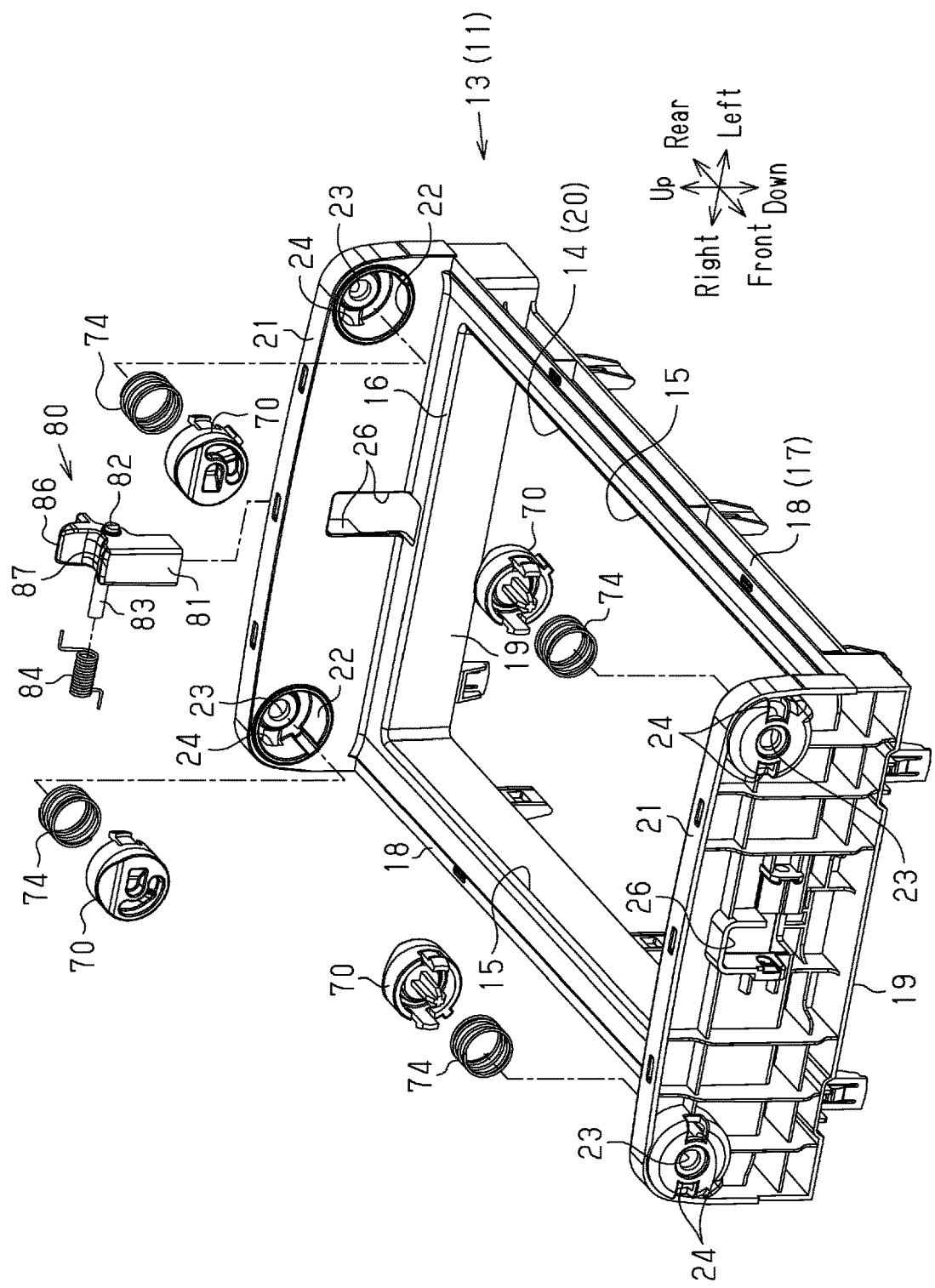
FIG. 3 is an exploded perspective view illustrating a supporting portion, shims, second springs, a striker, and third springs according to the embodiment.

As shown in FIGS. 2 and 3, the box main body 11 includes a box portion 12 having a bottom and an open upper end and a supporting portion 13 disposed above the box portion 12. The box portion 12 has a substantially rectangular parallelepiped shape that is longer in the front-rear direction than in the left-right direction. In the present embodiment, of the left-right direction and the front-rear direction of the box portion 12, the left-right direction, which is a direction having a smaller dimension, is defined as a "width direction" of the console box 10. In the present embodiment, the width direction of the console box 10 agrees with a vehicle width direction (left-right direction).

The supporting portion 13 has a symmetrical structure with respect to the front-rear direction and also has a symmetrical structure with respect to the left-right direction. Therefore, in the following description, the structure of one side in the front-rear direction of the supporting portion 13 will be described while omitting the description of the other side in some cases. Also, the structure of one side in the left-right direction of the supporting portion 13 will be described while omitting the description of the other side in some cases. The same applies not only to the supporting portion 13, but also to other members forming the console box 10.

A lower portion of the supporting portion 13 includes a rectangular frame portion 17. The space surrounded by the frame portion 17 and the internal space of the box portion 12 form an accommodation portion 20 for storing, for example, small articles. In the accommodation portion 20, the space surrounded by the frame portion 17 forms an upper opening 14 of the accommodation portion 20. The upper opening 14 has a rectangular shape in plan view. The upper opening 14 has two first sides 15 opposed to each other in the left-right direction and two second sides 16 opposed to each other in the front-rear direction (only one is shown in FIG. 3). The first sides 15 and the second sides 16 are orthogonal to each other.

As shown in FIG. 3, the frame portion 17 includes two parallel first wall portions 18, which extend in the front-rear direction while being spaced apart from each other in the left-right direction, and two parallel second wall portions 19, which extend in the left-right direction while being spaced apart from each other in the front-rear direction. The respective end portions in the left-right direction of the second wall portion 19 on the front side are connected to the front end portions of the respective first wall portions 18. The respective end portions in the left-right direction of the second wall portion 19 on the rear side are connected to the rear end portions of the respective first wall portions 18. Each first wall portion 18 includes the first side 15, and each second wall portion 19 includes the second side 16.

Figure 4:
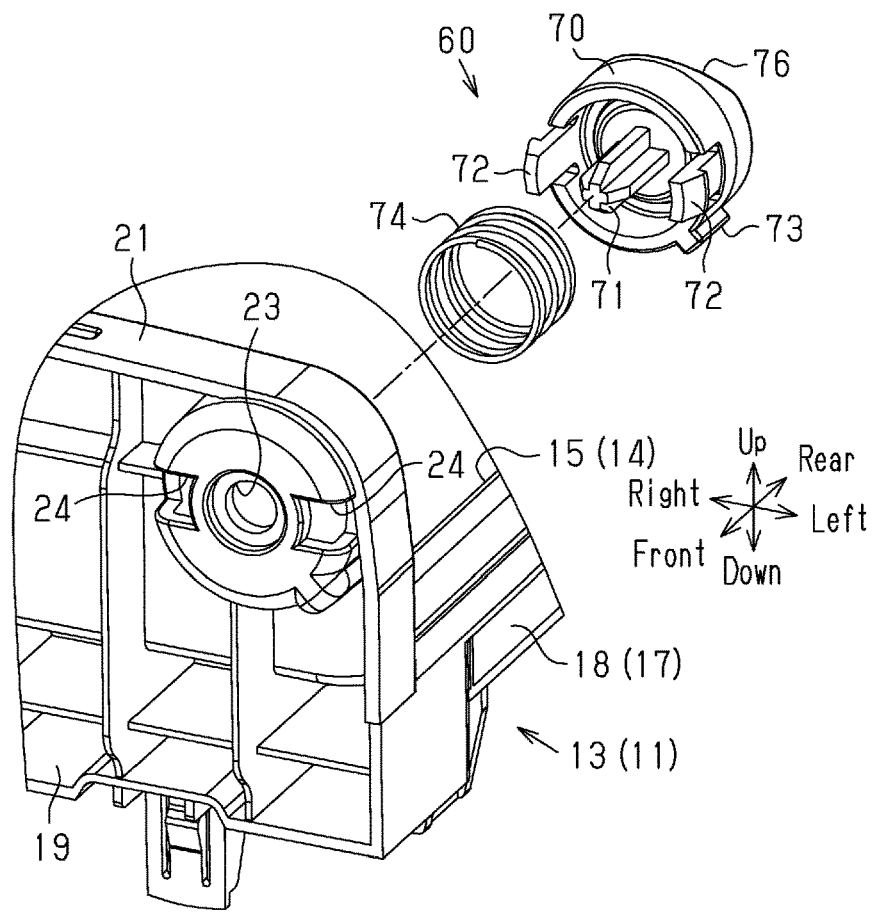
FIG. 4 is an exploded partial perspective view illustrating a front portion of the supporting portion, a shim, and a second spring according to the embodiment.
Figure 5:
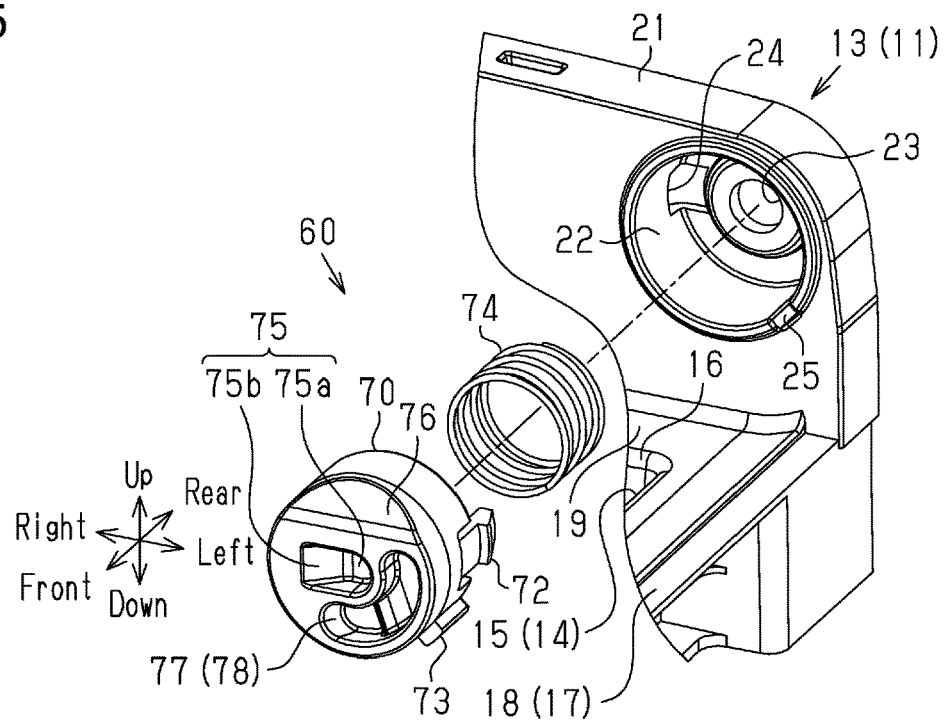
FIG. 5 is an exploded partial perspective view illustrating a rear portion of the supporting portion, a shim, and a second spring according to the embodiment.

Support wall portions 21 extend upward from the respective front and rear second wall portions 19. Each support wall portion 21 includes shim accommodating portions 22 opened in an inner surface in the front-rear direction of each support wall portion 21. The shim accommodating portions 22 are provided in opposite side portions in the left-right direction of each support wall portion 21. As shown in FIGS. 4 and 5, each shim accommodating portion 22 has a cylindrical shape extending in the front-rear direction. Each of the shim accommodating portions 22 includes an insertion hole 23, two engagement holes 24, and a rotation restricting groove 25. The insertion hole 23 of each shim accommodating portion 22 extends through the central portion of the bottom of the shim accommodating portion 22. The two engagement holes 24 of each shim accommodating portion 22 are located in opposite side portions in the left-right direction of the insertion hole 23 in the accommodating portion 22. The rotation restricting groove 25 extends in the front-rear direction in a state of protruding radially outward from a part of the outer peripheral portion of the shim accommodating portion 22.

<Lid 30>

The lid 30 is detachably coupled to the box main body 11. Further, when coupled to the box main body 11, the lid 30 is pivotal between a closing position, at which the lid 30 closes the upper opening 14 as indicated by the solid lines in FIG. 14, and a fully opening position, at which the lid 30 is in an upright state to fully open the upper opening 14 as indicated by the long-dash double-short-dash lines in FIG. 14. In other words, the lid 30 opens and closes the upper opening 14 by pivoting between the closing position and the fully open position. Therefore, hereinafter, the lid 30 in a state of closing the upper opening 14 will be described.

<Basic Structure of Lid 30>

Figure 8:
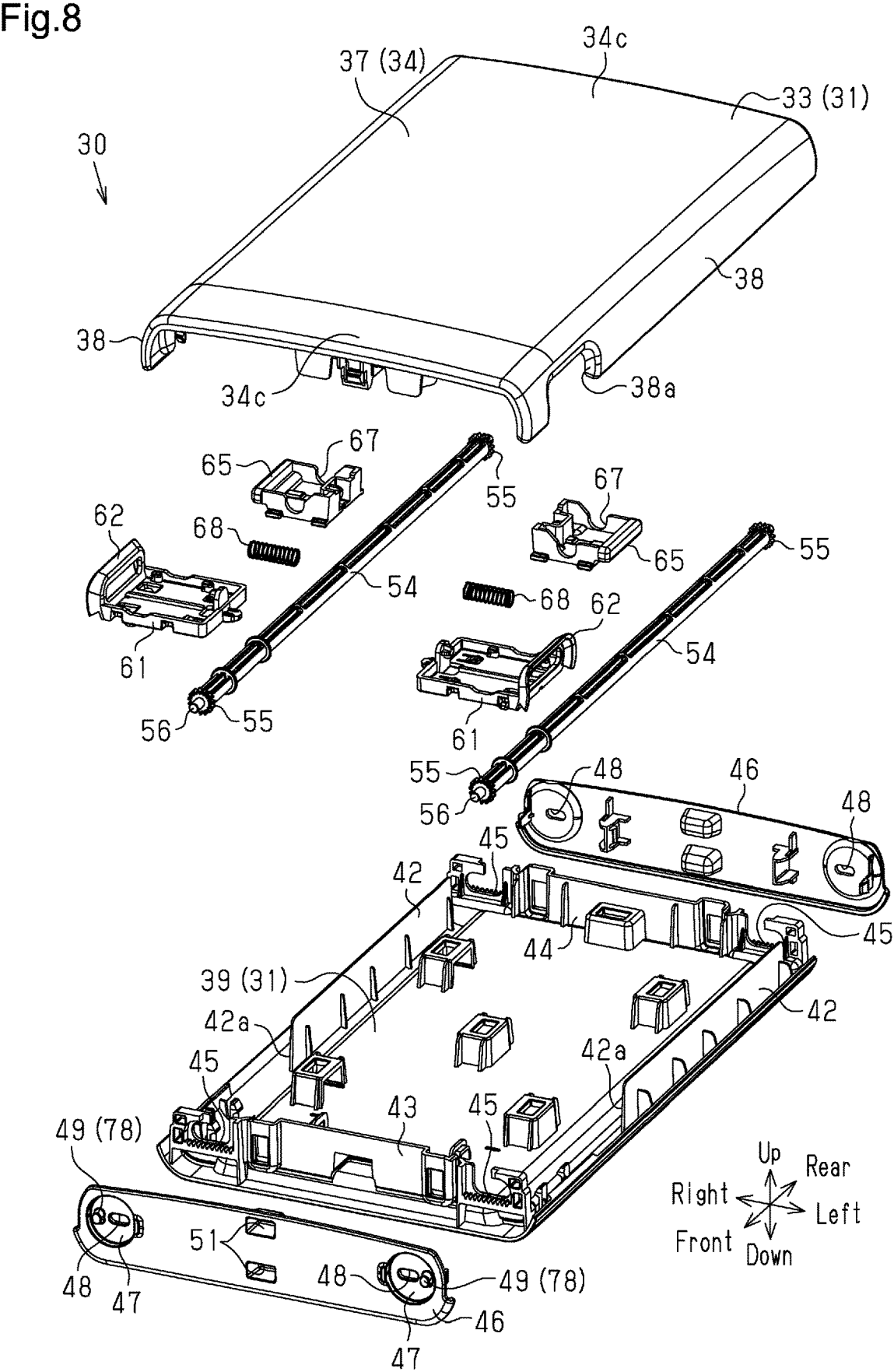
FIG. 8 is an exploded perspective view of a lid according to the embodiment.
Figure 10:
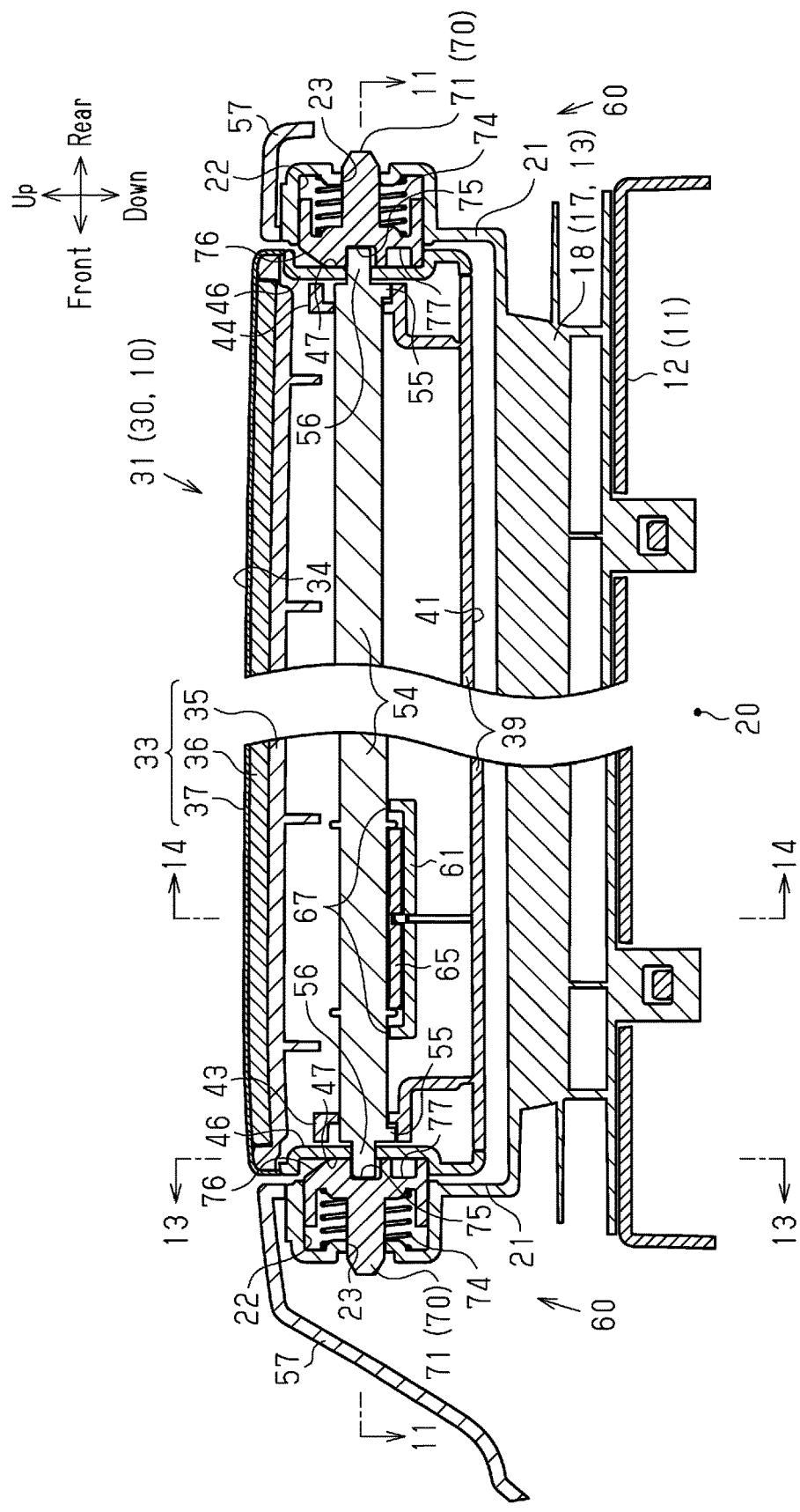
FIG. 10 is a longitudinal partial cross-sectional view of an upper portion of the console box according to the embodiment.
Figure 15A:
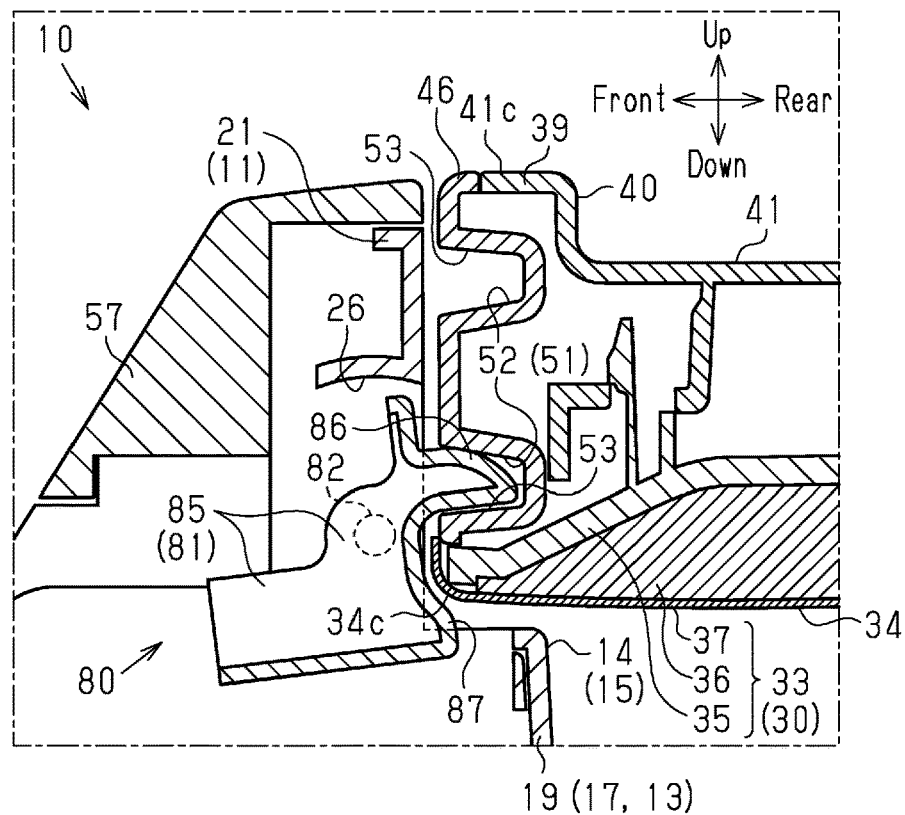
FIGS. 15A and 15B are longitudinal partial cross-sectional views illustrating operation of a push-up mechanism according to the embodiment.

As shown in FIG. 8, the lid 30 includes a lid main body 31, two supporting plate portions 46, and two pivot shafts 54. The lid main body 31 has a shape and a size capable of closing the upper opening 14 from above. The vertical direction of the lid main body 31 corresponds to its thickness direction. The lid main body 31 includes a first half body 33 located on one side in the thickness direction and a second half body 39 located on the other side and joined to the first half body 33. FIG. 10 illustrates the lid 30 in a state in which the first half body 33 is located above the second half body 39. FIG. 15A illustrates the lid 30 in a state in which the second half body 39 is located above the first half body 33.

As shown in FIGS. 10 and 15A, the first half body 33 includes a base member 35, which is made of a hard plastic, a cushion layer 36, which is stacked on the base member 35 and made of foam, and an outer layer 37, which is stacked on the cushion layer 36. The outer layer 37 is softer than a striker 81 of each push-up mechanism 80, which will be discussed below. A portion of the outer layer 37 that is a surface on one side in the thickness direction of the lid 30 forms a first surface 34 of the lid 30. The first surface 34 includes an armrest surface at least in a part. In the present embodiment, the entire first surface 34 forms an armrest surface.

The second half body 39 is entirely made of a hard plastic. The second half body 39 includes a recess 40, which opens outward in the thickness direction (refer to FIG. 15A). A surface of the second half body 39 on the opposite side (back side) to the first surface 34 in the thickness direction forms a second surface 41 of the lid 30. A portion of the second surface 41 inside the recess 40 is a tray surface.

Figure 11:
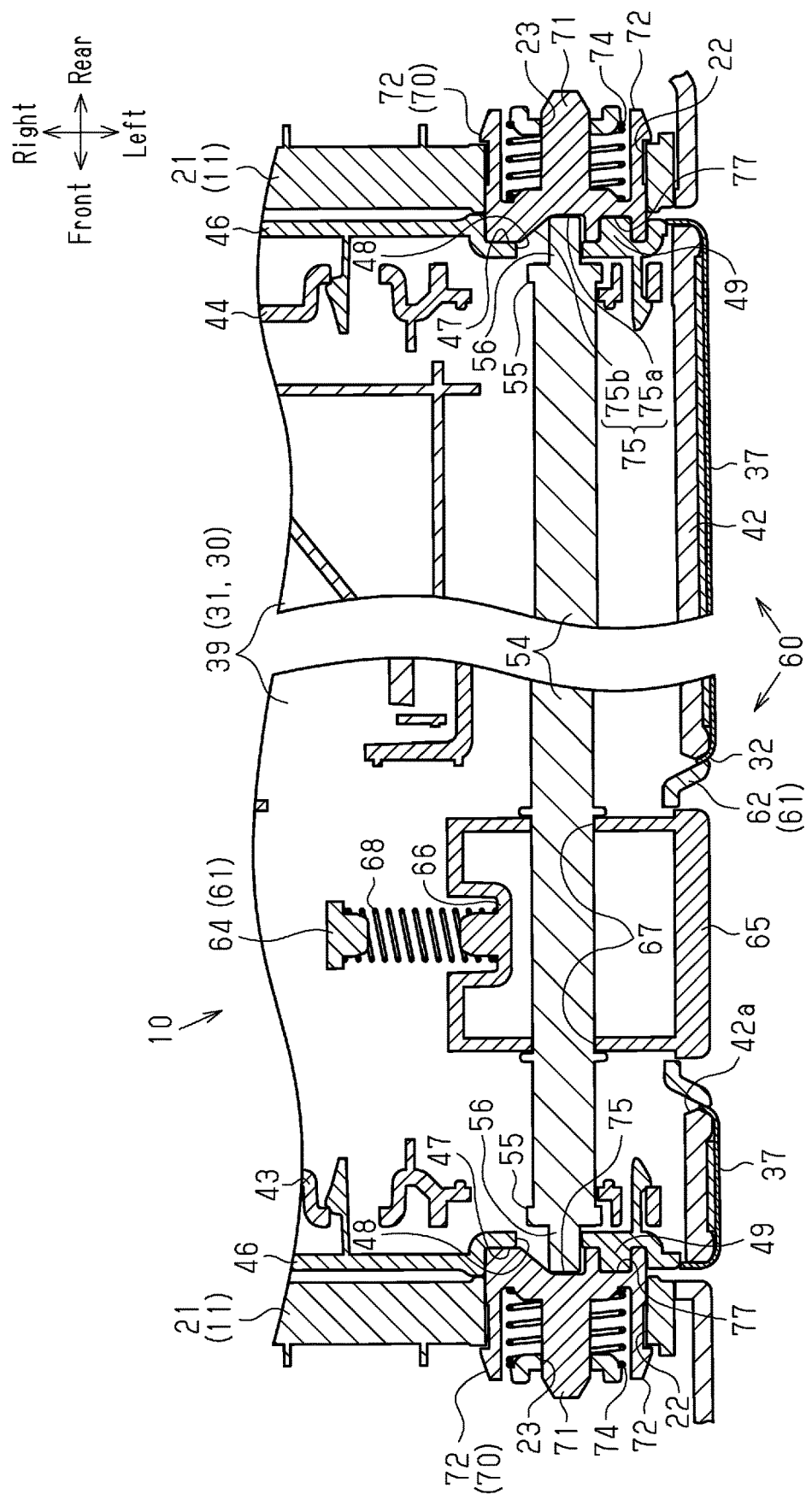
FIG. 11 is a partial cross-sectional view taken along line 11-11 of FIG. 10, illustrating the upper portion of the console box.

As shown in FIG. 8, the first half body 33 includes cutouts 38a in front parts of side wall portions 38 in the left-right direction. The second half body 39 also includes cutouts 42a in front parts of side wall portions 42 in the left-right direction. In a state in which the second half body 39 is joined to the first half body 33, an operation hole 32 is formed by the cutouts 38a and 42a as shown in FIG. 11.

As shown in FIG. 8, the two supporting plate portions 46 are disposed on opposite outer sides of the lid main body 31 in the front-rear direction. The supporting plate portion 46 on the front side is attached to the front wall portion 43 of the second half body 39, and the supporting plate portion 46 on the rear side is attached to the rear wall portion 44 of the second half body 39. An outer surface of each supporting plate portion 46 in the front-rear direction forms part of a side surface of the lid 30.

As shown in FIG. 10, the box main body 11 and the lid 30 have such shapes that the lid 30 can be detached from and coupled to the box main body 11 regardless of which of the first surface 34 and the second surface 41 of the lid 30 faces upward.

The two pivot shafts 54 have a function of pivotally coupling the lid main body 31 to the box main body 11. As shown in FIG. 8, the pivot shafts 54 extend in the front-rear direction while being parallel with each other in opposite side portions in the left-right direction of the lid main body 31. When a direction in which the axis of each pivot shaft 54 extends is referred to as an axial direction, the axial direction agrees with the front-rear direction of the vehicle in the present embodiment.

The lid 30 is pivotal between the closing position and the fully open position about a selected one of the two pivot shafts 54.

Each pivot shaft 54 includes pinions 55 on the outer circumference of the opposite end portions in the front-rear direction. The second half body 39 includes racks 45 in opposite side portions in the left-right direction in each of the front wall portion 43 and the rear wall portion 44. The pinions 55 at the front end portions of the pivot shafts 54 are meshed with the racks 45 of the front wall portion 43, and the pinions 55 at the rear end portions of the pivot shafts 54 are meshed with the racks 45 of the rear wall portion 44.

Each pivot shaft 54 includes pin portions 56 extending in the front-rear direction on the outer sides in the front-rear direction of the respective pinions 55. Each of the front and rear supporting plate portions 46 includes recesses 47, which are recessed inward in the front-rear direction, in opposite side portions. An elongated hole 48 extending in the left-right direction is formed in the bottom of each recess 47 so as to extend through the supporting plate portion 46. The pin portions 56 of each pivot shaft 54 are inserted into the elongated holes 48.

The lid 30 can pivot integrally with one of the pivot shafts 54. The pinions 55 can roll on the racks 45. At this time, each elongated hole 48 allows the pin portion 56 to move in the left-right direction and defines the range of movement of the pin portion 56 in the left-right direction.

<Housing 57>

As shown in FIGS. 1, 10, and 15A, the housing 57 accommodates the box main body 11 in a state in which the upper surface and the side surface of the lid 30 are exposed. FIG. 1 shows only part of the housing 57.

<Lock Mechanism 60>

Figure 12:
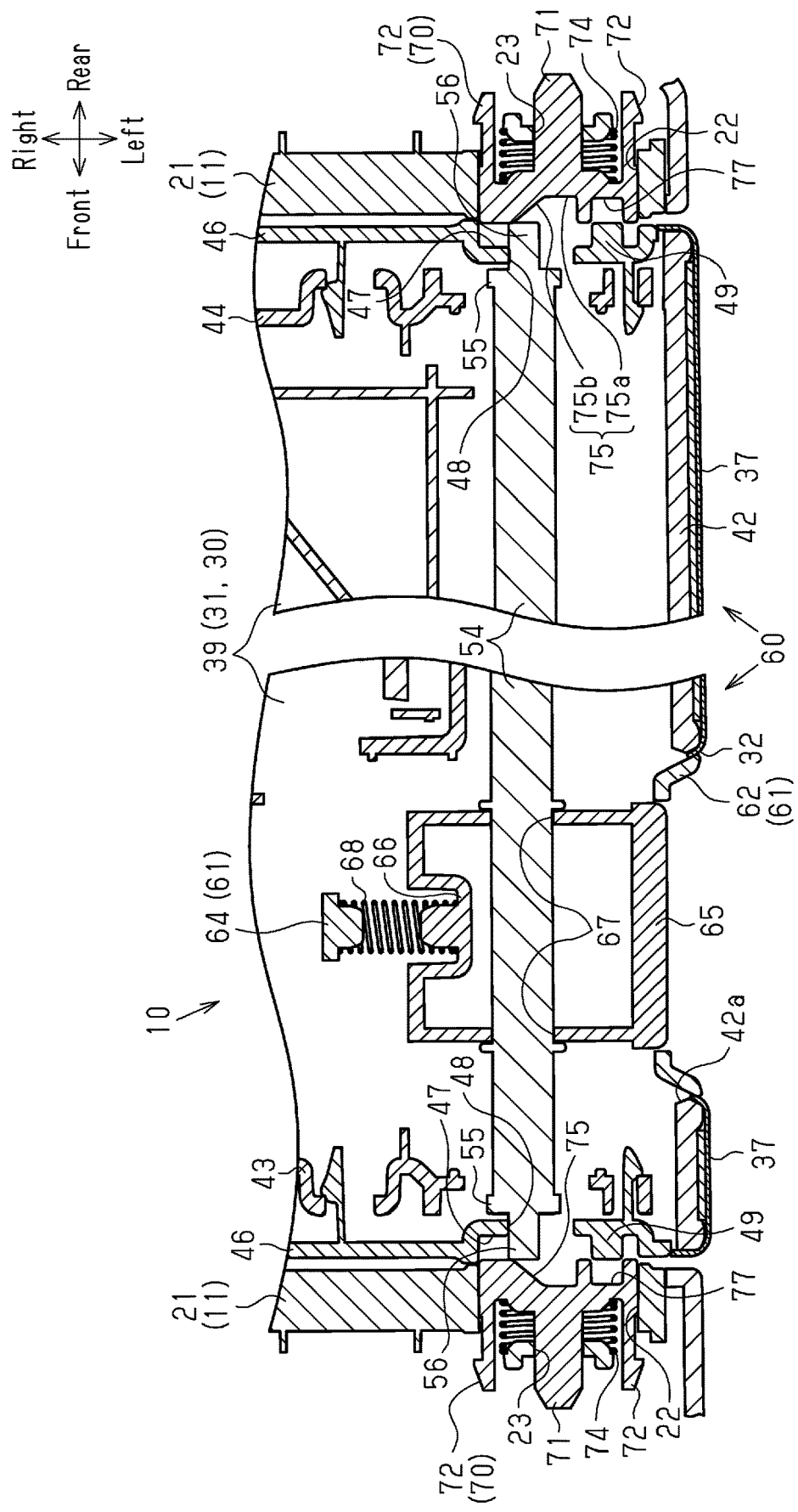
FIG. 12 is a partial cross-sectional view corresponding to FIG. 11, illustrating the upper portion of the console box in a in which an operation portion is pressed inward.

As shown in FIGS. 11 and 12, each lock mechanism 60 has a function of locking the lid 30 in a state (closing position) in which the lid 30 closes the upper opening 14 and a function of unlocking the lid 30. Each lock mechanism 60 also has a function of switching between a coupled state in which the pivot shafts 54 are coupled to the box main body 11 and a state in which the pivot shafts 54 are decoupled from the box main body 11.

The unlocked state includes the following two states;
- a state in which both the left and right pivot shafts 54 are decoupled from the box main body 11; and
- a state in which the one pivot shaft 54 keeps being coupled to the box main body 11, and the other pivot shaft 54 is decoupled from the box main body 11.

Figure 9:
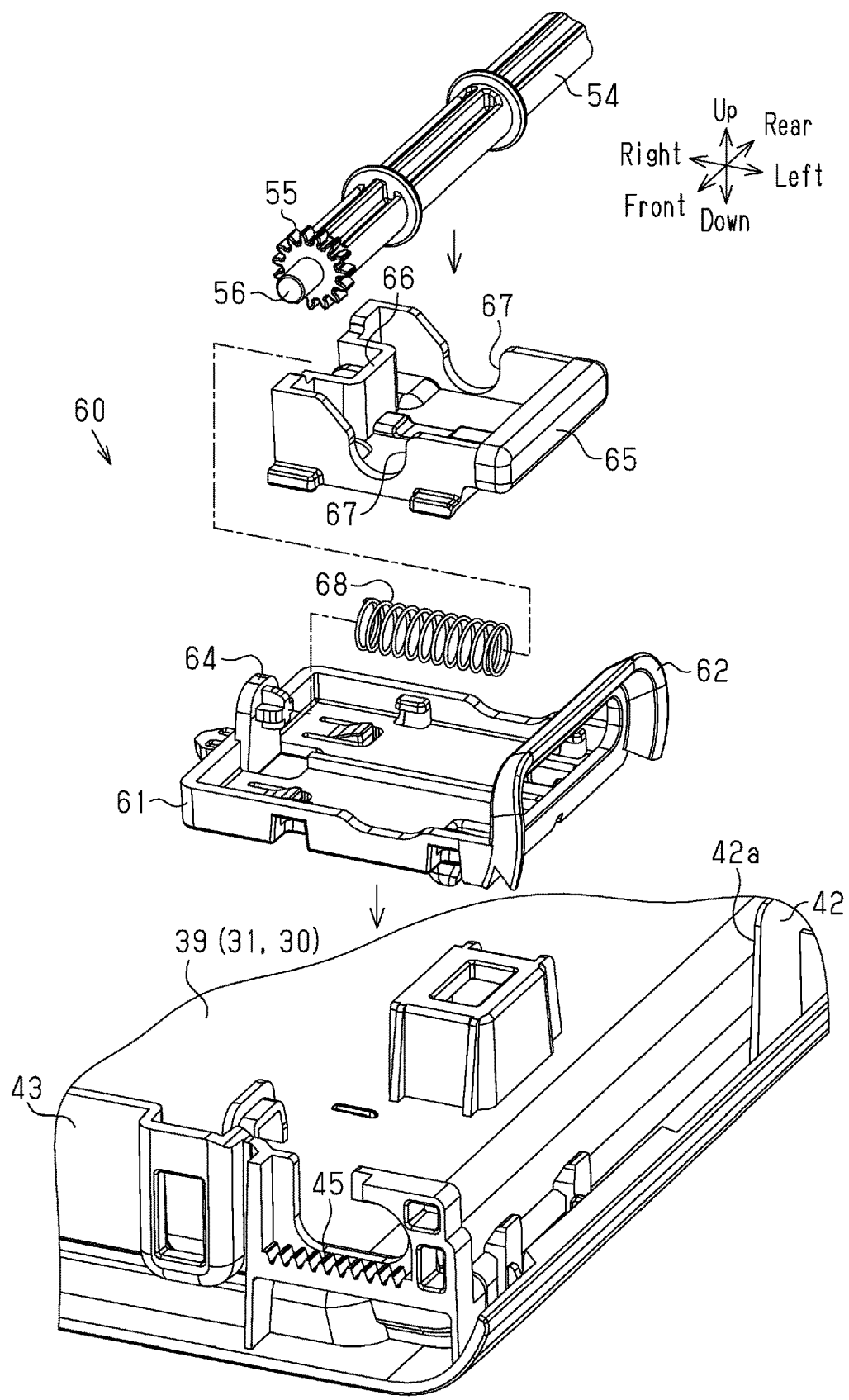
FIG. 9 is an exploded partial perspective view of the lid according to the embodiment.

As shown in FIGS. 9 to 11, operation bases 61 are attached to opposite side portions in the left-right direction in the front part in the lid 30. A gate portion 62 is formed at an outer portion in the left-right direction of each of the left and right operation bases 61. The gate portion 62 of each operation base 61 is disposed in the operation hole 32 of the lid main body 31. A spring seat 64 is formed on an inner side portion in the left-right direction of each operation base 61.

An operation portion 65 is disposed on each operation base 61 so as to be slidable in the left-right direction through the gate portion 62. The left and right operation portions 65 are independent of each other. A spring seat 66 is formed at an inner side portion in the left-right direction of each operation portion 65. The spring seat 66 is located at a position facing the spring seat 64. A first spring 68 is disposed between the two spring seats 64, 66 while being compressed in the left-right direction. Each operation portion 65 is always urged outward in the left-right direction by the corresponding first spring 68. Each operating portion 65 includes an arcuate shaft receiving portion 67 with upper opening in each of the opposite side portions in the front-rear direction. Each pivot shaft 54 is pivotally supported by the operation portion 65 at the shaft receiving portions 67.

Although a coil spring is used as the first spring 68 in the present embodiment, another type of spring may be used. The same applies a second spring 74, which will be discussed below.

As shown in FIGS. 4, 5, 10, and 11, a shim 70 is accommodated in each of the left and right shim accommodating portions 22 of each support wall portion 21. Each shim 70 is attached to the support wall portion 21 in a state in which the shim 70 is movable in the front-rear direction and rotation thereof is restricted. Each shim 70 has a function of detachably coupling an end portion of the corresponding pivot shaft 54 to the box main body 11. Further, each shim 70 has a function of pivotally supporting the corresponding pivot shaft 54 in a state in which the end portions of the pivot shaft 54 are coupled to the box main body 11.

Each shim 70 has a cylindrical shape with the outer portions in the front-rear direction open. Each shim 70 includes a shaft portion 71, two hooks 72, and a rotation restricting protrusion 73, which extend in the front-rear direction. The shaft portion 71 of each shim 70 is formed at a central portion of the shim 70, and is inserted into the insertion hole 23 of the corresponding shim accommodating portion 22 so as to be movable in the front-rear direction. The two hooks 72 of each shim 70 are formed at locations on the left and right sides of the shaft portion 71 in the shim 70, and are inserted into the engagement holes 24 of the corresponding shim accommodating portion 22 so as to be movable in the front-rear direction. The rotation restricting protrusion 73 of each shim 70 protrudes outward in the radial direction from a part of the outer peripheral portion of the shim 70, and is engaged with the rotation restricting groove 25 of the corresponding shim accommodating portion 22 so as to be movable in the front-rear direction.

Each shim 70 is configured to be movable in the front-rear direction between a coupling position, at which the shim 70 is in contact with the bottom of the recess 47 in the supporting plate portion 46 as shown in FIG. 11, and a removal position, at which the shim 70 is spaced outward from the coupling position in the front-rear direction as shown in FIG. 12.

The shaft portion 71, the two hooks 72, and the rotation restricting protrusion 73 of each shim 70 have a function of guiding movement in the front-rear direction of the shim 70. The two hooks 72 also have a function of restricting the shim 70 from falling out from the shim accommodating portion 22 toward the inner side in the front-rear direction. This function is exhibited when each hook 72 is engaged with a peripheral portion of the corresponding engagement hole 24 in the shim accommodating portion 22.

A second spring 74 is disposed between the shim 70 and the inner bottom surface of each shim accommodating portion 22 in each of the front and rear support wall portions 21 in a state of being compressed in the front-rear direction. Each shim 70 is always urged inward in the front-rear direction by the second spring 74.

As shown in FIGS. 4, 5, 10, and 11, each shim 70 includes a receiving recess 75 and an outer inclined surface 76. The receiving recess 75 includes a reference surface 75a and an inner inclined surface 75b. The receiving recess 75 of each shim 70 is open on the inner surface in the front-rear direction. The reference surface 75a of each receiving recess 75 is located at the central portion of the shim 70 and is orthogonal to the axis of the shim 70. The inner inclined surface 75b of each receiving recess 75 is located on the inner side in the left-right direction of the reference surface 75a and is connected to the reference surface 75a. Each inner inclined surface 75b is inclined with respect to the reference surface 75a such that the inner inclined surface 75b extends toward the inner side in the front-rear direction as the inner inclined surface 75b extends toward the inner side in the left-right direction.

The outer inclined surface 76 of each shim 70 is formed on an upper portion of an inner surface in the front-rear direction of the shim 70. Each outer inclined surface 76 is inclined with respect to a vertical plane such that the outer inclined surface 76 extends downward as the outer inclined surface 76 extends toward the inner side in the front-rear direction.

<Pivot Range Defining Portion 78>

Figure 13:
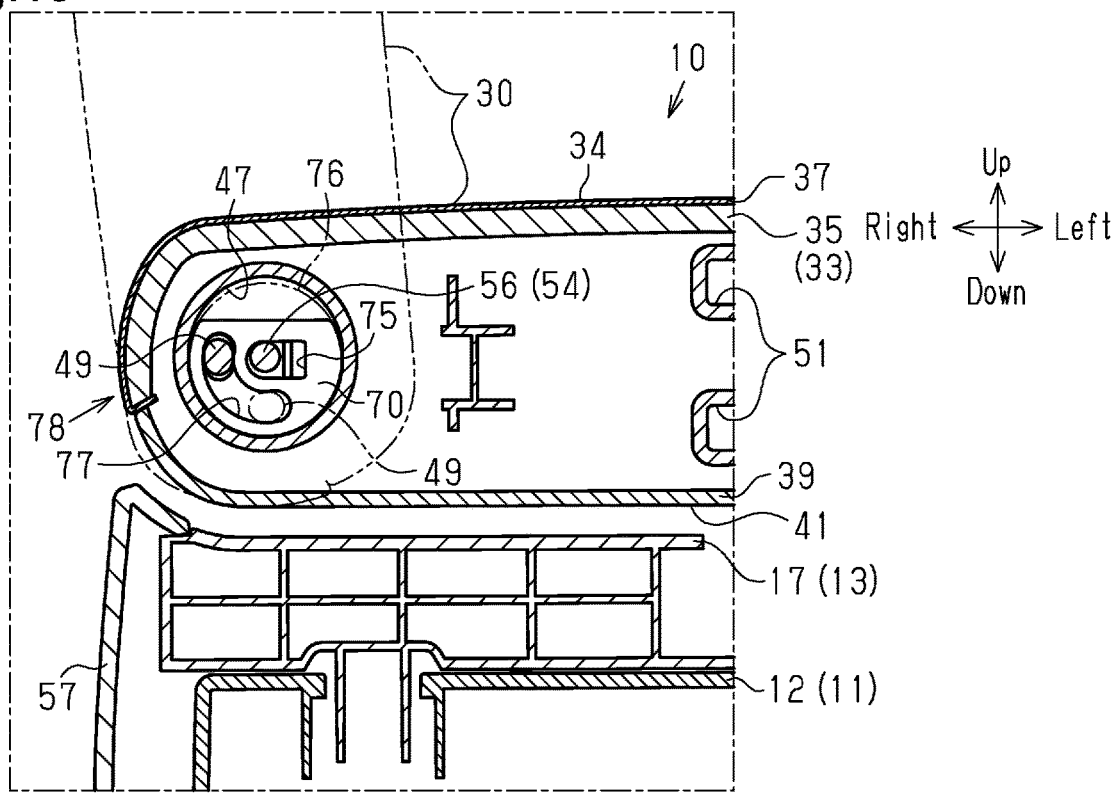
FIG. 13 is a partial cross-sectional view taken along line 13-13 of FIG. 10, illustrating the upper portion of the console box.

The pivot range defining portion 78 defines a pivot range of the lid 30 such that the lid 30 pivots between the closing position and the fully open position described above. As shown in FIGS. 5, 8, and 13, the pivot range defining portion 78 includes four protrusions 49 (only two on the front side are shown in FIG. 8) of the lid 30 and a groove portion 77 of the shim 70.

More specifically, each protrusion 49 protrudes outward in the front-rear direction from a position outside the elongated hole 48 in the left-right direction of each of the front and rear supporting plate portions 46. Each protrusion 49 revolves around the pivot shaft 54 in accordance with a pivoting motion of the lid 30.

Each groove portion 77 has an arcuate shape centered on the reference surface 75a of the receiving recess 75. Each of the groove portions 77 is open in the inner surface in the front-rear direction of the shim 70. Each protrusion 49 is inserted into the corresponding groove 77. Each protrusion 49 is movable in the circumferential direction along the groove 77. Each groove portion 77 is formed such that the lid 30 is located at the closing position when the protrusion 49 moves to one end portion in the circumferential direction of the groove portion 77, and that the lid 30 is located at the fully open position when the protrusion 49 moves to the other end portion.

<Push-Up Mechanism 80>

Figure 7:
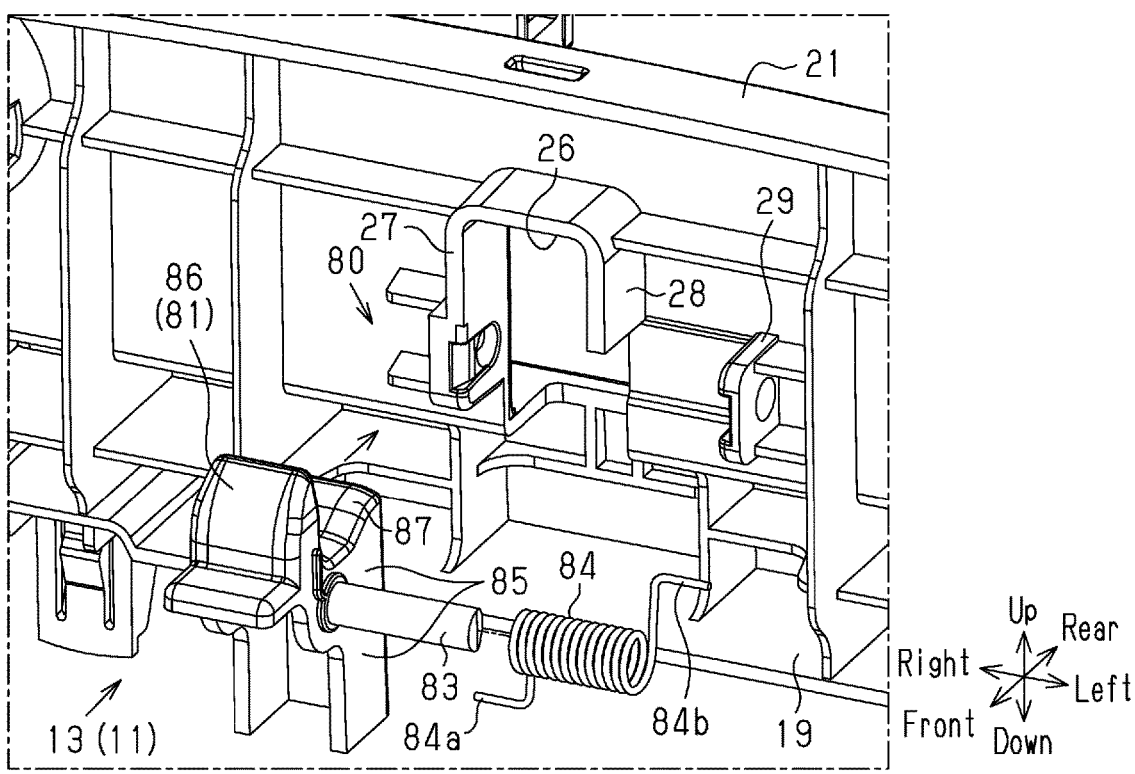
FIG. 7 is an exploded partial perspective view illustrating a state before the striker and the third spring are attached to the support wall portion on the front side according to the embodiment.

As shown in FIGS. 3, 6, and 7, the push-up mechanisms 80 are mechanisms that push up the lid 30 from the box main body 11 in response to unlocking of the lid 30 by the left and right lock mechanisms 60, and are provided at two positions in the present embodiment. The two positions are opposite side portions of the upper opening 14 in the direction in which the first sides 15 extend, and are opposite side portions of the upper opening 14 in the front-rear direction in the present embodiment. Each push-up mechanism 80 is provided at a central portion in the left-right direction.

The front and rear push-up mechanisms 80 have a symmetrical structure with respect to the front-rear direction. Each of the push-up mechanisms 80 includes a first pushed-up portion, a second pushed-up portion, a striker 81, and an urging member.

As shown in FIGS. 8 and 15A, each supporting plate portion 46 includes recesses 51 at two locations spaced apart from a central portion in the thickness direction of the lid 30 in opposite directions by an equal distance. The two recesses 51 of each supporting plate portion 46 are open in the outer surface in the front-rear direction of the supporting plate portion 46.

Each recess 51 includes two inner wall surfaces 52, 53 facing each other in the thickness direction. Of the two inner wall surfaces 52, 53 of each recess 51, the inner wall surface 52 closer to the central portion in the thickness direction forms the first pushed-up portion. Further, each of the opposite edges in the front-rear direction of the first surface 34 includes a central portion 34c in the left-right direction. Each of the opposite edges in the front-rear direction of the second surface 41 includes a central portion 41c. The central portions 34c, 41c form the second pushed portion.

As shown in FIGS. 3 and 15A, each support wall portion 21 includes a striker accommodating portion 26 at a central portion in the left-right direction. As shown in FIG. 7, the striker accommodating portion 26 of each support wall portion 21 includes a first vertical wall portion 27 and a second vertical wall portion 28. The first vertical wall portion 27 and the second vertical wall portion 28 of each striker accommodating portion 26 extend in the vertical direction and the front-rear direction while being separated from each other in the left-right direction. The front and rear end portions of each striker accommodating portion 26 are open. An auxiliary vertical wall portion 29 is formed at a position spaced apart from the second vertical wall portion 28 by a certain distance in a direction away from the first vertical wall portion 27. The auxiliary vertical wall portion 29 extends in the vertical direction and the front-rear direction while being parallel with the second vertical wall portion 28.

As shown in FIGS. 3 and 7, each striker 81 is accommodated in the striker accommodating portion 26. Each striker 81 includes shafts 82, 83, which extend from the opposite side surfaces in the left-right direction so as to be away from each other in the left-right direction. One shaft 82 is inserted into the first vertical wall portion 27, and the other shaft 83 passes below the second vertical wall portion 28, extends to the side away from the first vertical wall portion 27, and is inserted into the auxiliary vertical wall portion 29. Each striker 81 is pivotally supported by the first vertical wall portion 27 and the auxiliary vertical wall portion 29 of the support wall portion 21 with the two shafts 82, 83.

A third spring 84, which serves as an urging member, is installed between each striker 81 and the support wall portion 21 so as to satisfy the following condition. In the present embodiment, a torsion coil spring is used as the third spring 84.

The condition is that the striker 81 is urged in the pivoting direction in which the lid 30 is pushed up. Of the pivoting directions of the striker 81 about the shafts 82, 83, the pivoting direction in which the striker 81 pushes up the lid 30 is referred to as an urged pivoting direction. To satisfy the above condition, most of the third spring 84 is disposed around the shaft 83 of each striker 81 in the present embodiment. As shown in FIGS. 6 and 7, one end portion 84a of the third spring 84 is engaged with the striker 81 at a position radially outward away from the shaft 83. Another end portion 84b of the third spring 84 is engaged with the support wall portion 21, specifically, a part of the auxiliary vertical wall portion 29 that is radially outward away from the shaft 83.

As shown in FIGS. 7 and 15A, each striker 81 includes a body portion 85, a first push-up portion 86, and a second push-up portion 87. The body portion 85 of each striker 81 is a framework of the striker 81 and includes the shafts 82, 83. The first push-up portion 86 of each striker 81 includes a protrusion that protrudes outward from the body portion 85 in the radial direction of the shafts 82, 83. The second push-up portion 87 of each striker 81 is formed at a position on the trailing side of the first push-up portion 86 in the urged pivoting direction of the third spring 84. The second push-up portion 87 includes by a protrusion that protrudes outward in the radial direction from the body portion 85. The first push-up portion 86 of each striker 81 enters the lower recess 51 in a state in which the upper opening 14 is closed by the lid 30, and is removed from the recess 51 as the lid 30 is raised. Each first push-up portion 86 applies a push-up force to the inner wall surface 52 (the first pushed-up portion) of the recess 51 when in the recess 51.

In the closed state, the second push-up portion 87 of each striker 81 is separated downward from the lower surface of the lid 30, more specifically, one of the central portions 34c and 41c (second pushed-up portion) that is located on the lower side. After a push-up action by the first push-up portion 86, each second push-up portion 87 comes into contact with the lower surface (the central portions 34c and 41c) to apply a push-up force to the lower surface.

Operation of the present embodiment will now be described.

<Case in which Neither of Operation Portions 65 is Pressed Inward>

Figure 14:
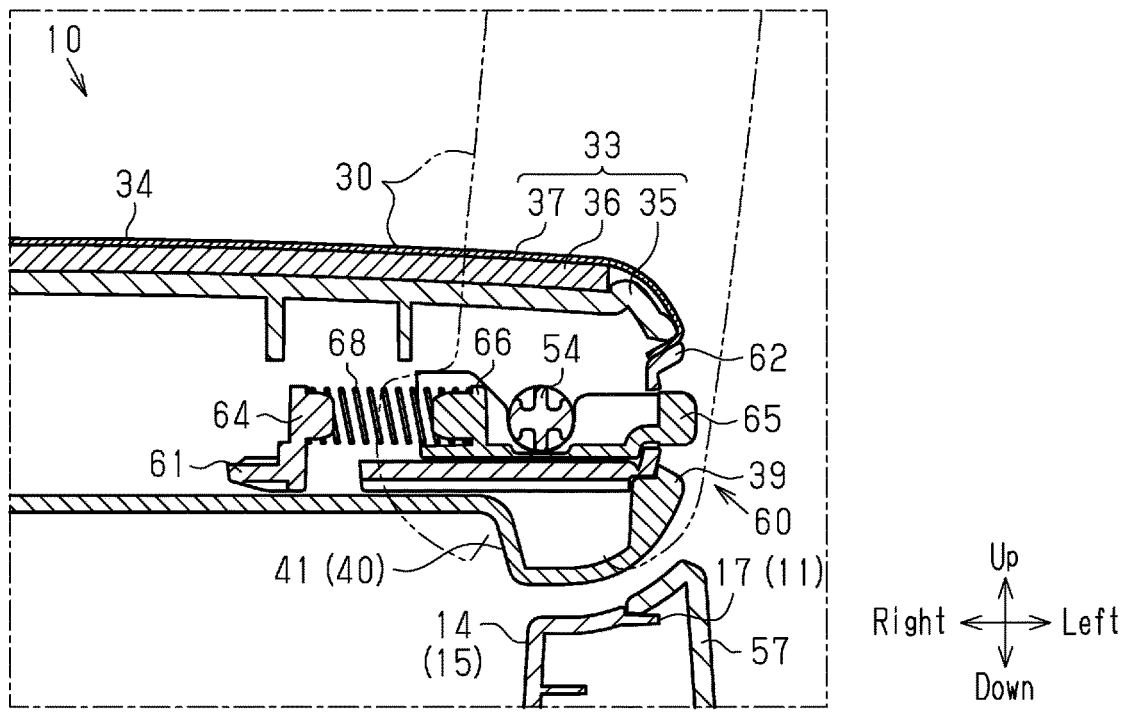
FIG. 14 is a partial cross-sectional view taken along line 14-14 of FIG. 10, illustrating the upper portion of the console box.

As indicated by solid the lines in FIGS. 11 and 14, when the lid 30 is located at the closing position and neither of the operation portions 65 is pressed inward, the outer portions in the left-right direction of the left and right operation portions 65 protrude from the gate portions 62. In this case, each shim 70 urged inward in the front-rear direction by the second spring 74 comes into contact with the bottom of the recess 47 in the supporting plate portion 46 and is held at the coupling position. The urging force of the first spring 68 urging each operation portion 65 outward in the left-right direction is transmitted to the pivot shaft 54 via the operation portion 65. The front and rear pin portions 56 of each pivot shaft 54 are in contact with the reference surfaces 75a in the receiving recesses 75. Each pin portion 56 is located at an outer end portion in the left-right direction of the elongated hole 48. The pinion 55 of each pivot shaft 54 meshes with an outer portion in the left-right direction of the rack 45. The left and right pivot shafts 54 are coupled to the front and rear support wall portions 21 with the front and rear shims 70. Therefore, the lid 30 is locked at the closing position, and the upper opening 14 is maintained in the closed state.

At this time, the striker 81 of each push-up mechanism 80 is urged by the third spring 84 in the urged pivoting direction for pushing up the lid 30.

At this time, the first surface 34 of the outer layer 37 of the lid 30 may be facing downward as shown in the FIG. 15A. If the push-up force of the striker 81 acts on the first surface 34, a dent is likely to be formed in the central portion 34c of the first surface 34. When the lid 30 in a position in which the first surface 34 having such a dent faces upward closes the upper opening 14, the dent is visible to the user of the console box 10, resulting in a degraded appearance of the lid 30.

However, in the present embodiment, in the state in which the upper opening 14 is closed by the lid 30, the first push-up portion 86 of each striker 81 enters the lower recess 51, which opens in the side surface of the lid 30. At this time, the second push-up portion 87 of each striker 81 is separated downward from the lower surface (the central portion 34c) of the lid 30. Therefore, the push-up force of the second push-up portion 87 does not act on the lower surface (the central portion 34c) of the lid 30, so that the lower surface (the central portion 34c) is unlikely to be dented.

<Case in which One of Operation Portions 65 is Pressed Inward>

As shown in FIG. 12, when one of the pair of operation portions 65 is pressed inward in the left-right direction against the urging force of the first spring 68, a force is applied to the pivot shaft 54 supported by the shaft receiving portion 67 to move the pivot shaft 54 inward in the left-right direction. The pinions 55 on the front and rear sides of the pivot shaft 54 mesh with the racks 45 and are capable of rolling inward in the left-right direction. The front and rear pin portions 56 of the pivot shaft 54 are movable inward in the left-right direction along the elongated holes 48 of the front and rear supporting plate portions 46. Accordingly, in response to the press-in action of the operation portion 65, the pivot shaft 54 moves inward in the left-right direction while rotating.

With the above-described movement of the pivot shaft 54, each of the front and rear pin portions 56 moves from the reference surface 75a to the inner inclined surface 75b in the receiving recess 75. Each inner inclined surface 75b is inclined with respect to the reference surface 75a such that the inner inclined surface 75b extends toward the inner side in the front-rear direction as the inner inclined surface 75b extends toward the inner side in the left-right direction. Therefore, each of the front and rear shims 70 is pressed against the urging force of the second spring 74 and moves outward in the front-rear direction. The moving direction of the shim 70 at this time is a direction away from the pivot shaft 54 in the front-rear direction.

Then, as shown in FIG. 12, when the front and rear shims 70 are moved to the removal position, the front and rear pin portions 56 are removed from the receiving recesses 75. The pivot shaft 54 is decoupled from the support wall portions 21 (box main body 11). That is, the lock mechanism 60 unlocks the lid 30.

The pivot shaft 54 corresponding to the operation portion 65 that is not pressed inward continues to be coupled to the support wall portions 21 (the box main body 11).

Figure 15B:
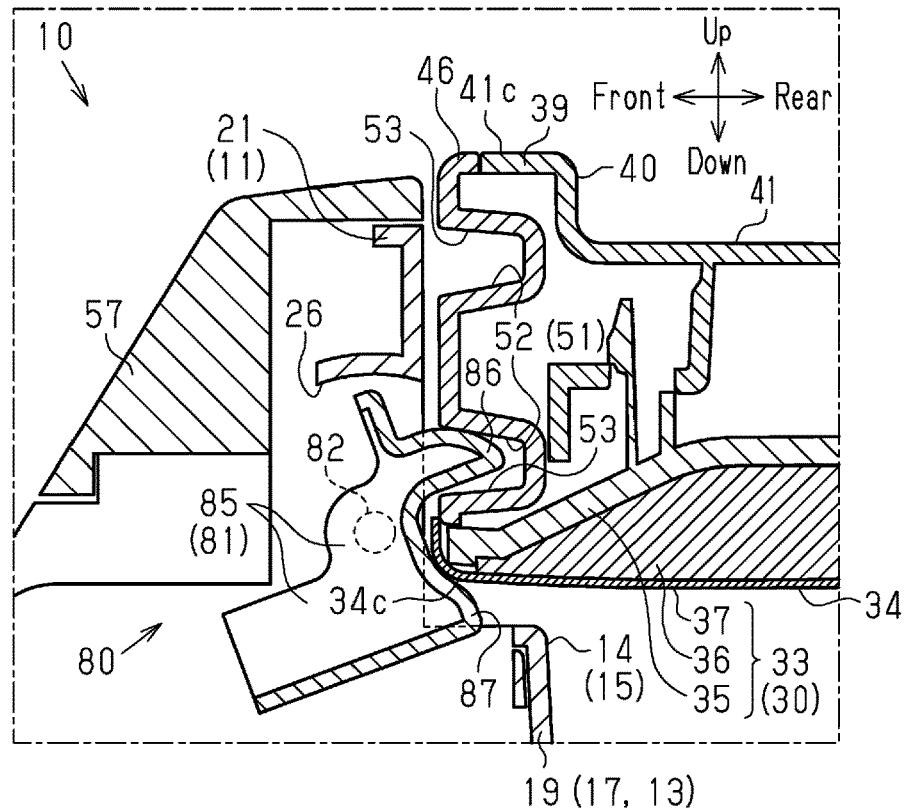

On the other hand, the lid 30 receives a push-up force by the front and rear push-up mechanisms 80. As shown in FIG. 15B, the striker 81 urged by the third spring 84 pivots in an urged pivoting direction (counterclockwise direction as viewed in FIG. 15B), in which the lid 30 is pushed up. Along with this pivoting motion, the inner wall surface 52 (first pushed-up portion) of the lower recess 51 receives a push-up force from the first push-up portion 86, so that the lid 30 is pushed up.

The lid 30 pivots upward about the pivot shaft 54 corresponding to the operation portion 65 that is not pressed inward.

Figure 16A:
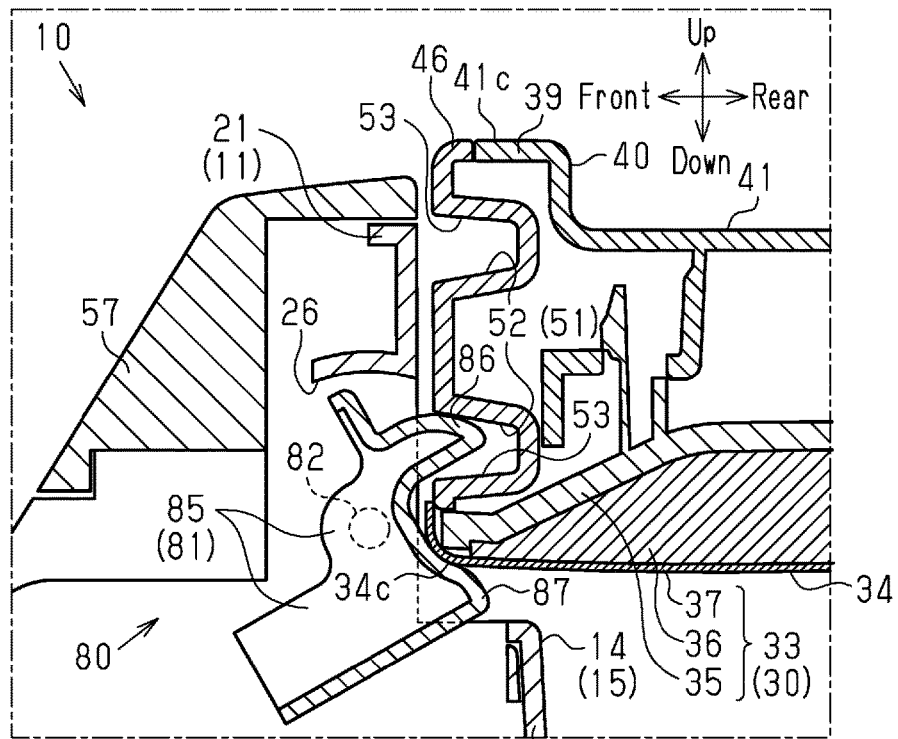
FIGS. 16A and 16B are also longitudinal partial cross-sectional views illustrating operation of the push-up mechanism according to the embodiment.
Figure 16B:
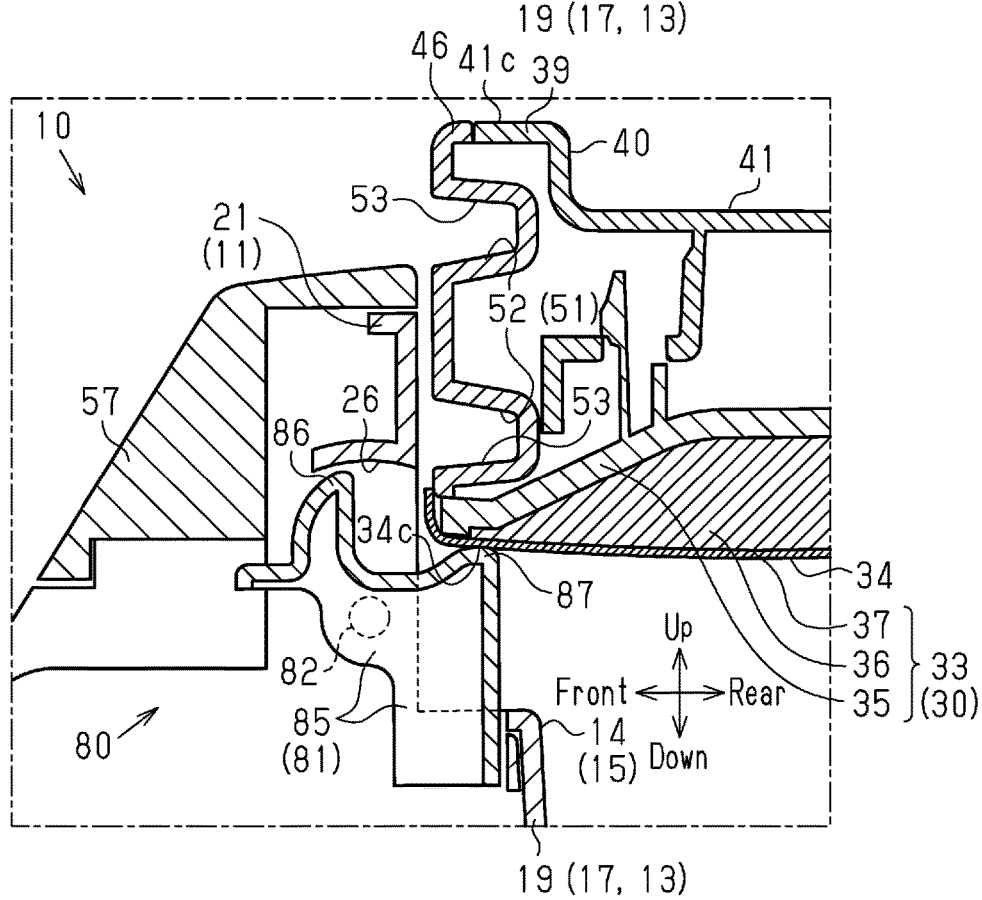

Along with the above-described pivoting motion of the striker 81, the first push-up portion 86 is removed from the recess 51 as shown in FIG. 16A, and the second push-up portion 87 approaches the lower surface of the lid 30, in this case, the central portion 34c (second pushed-up portion) of the first surface 34. Then, the pivoting motion of the striker 81 continues even after the first push-up portion 86 is removed from the recess 51 and the push-up by the first push-up portion 86 is finished. As shown in FIG. 16B, the second push-up portion 87 comes into contact with the lower surface of the lid 30 (the central portion 34c) to apply a push-up force to the lower surface. The lid 30 continues to be pushed up by the push-up force of the second push-up portion 87. The pivoting motion of each of the front and rear strikers 81 is stopped when the striker 81 comes into contact with the second wall portion 19 as shown in FIG. 16B.

A push-up force acts on the lower surface (the central portion 34c) of the lid 30 as described above. However, the time during which the push-up force acts is at the time when the lock mechanism 60 unlocks the lid 30, and is a short time in the latter stage of the push-up period. The time during which the push-up force acts in this case is shorter than in a case in which the push-up force always acts on the lower surface of the lid 30 when the upper opening 14 is closed by the lid 30. Therefore, the lower surface (the central portion 34c) of the lid 30 is unlikely to be dented.

The lid 30 is inclined such that the side on which the operation portion 65 is operated is higher of the opposite side portions in the left-right direction.

When the lid 30 is unlocked so that the operation portion 65 is no longer pressed inward, the first spring 68 corresponding to the operation portion 65 releases the accumulated urging force. The released urging force moves the operation portion 65 outward in the left-right direction together with the pivot shaft 54 as shown in FIG. 11. At this time, the pinions 55 on the front and rear sides of the pivot shaft 54 roll outward in the left-right direction on the racks 45, with which the pinions 55 are meshed.

Along with the movement, the outer side portion in the left-right direction of the operation portion 65 protrudes outward in the left-right direction from the gate portion 62 of the operation base 61. The above-described movement of the operation portion 65 and the pivoting motion of the pivot shaft 54 are stopped when the front and rear pin portions 56 come into contact with outer end portions in the left-right direction of the elongated holes 48.

Further, in each of the front and rear support wall portions 21, the urging force accumulated in the second spring 74 is released. The released urging force causes each shim 70 to move inward in the front-rear direction as shown in FIG. 11. The above-described movement of each shim 70 is restricted by each hook 72 being engaged with a peripheral portion of the corresponding engagement hole 24 in the shim accommodating portion 22.

<Case in which Both Operation Portions 65 are Pressed Inward Simultaneously>

The left and right operation portions 65 are independent of each other. Therefore, when both operation portions 65 are simultaneously pressed inward against the urging force of the first springs 68, the same action as described in the section <When one of the operation portions 65 is pressed inward> is performed on each pivot shaft 54.

When each of the two pivot shafts 54 is removed from the corresponding receiving recess 75, the pivot shafts 54 and the box main body 11 are decoupled from each other.

On the other hand, the lid 30 receives a push-up force by the push-up mechanisms 80. Both strikers 81, which are urged by the third springs 84, pivot in the urged pivoting direction for pushing up the lid 30 as shown in FIGS. 15B, 16A, and 16B. With this pivoting motion, a push-up force is applied from the first push-up portions 86 to the inner wall surfaces 52 of the lower recesses 51, and the lid 30 is pushed up.

In this case also, the first push-up portions 86 are removed from the recesses 51, and the second push-up portions 87 approach the lower surface of the lid 30 in response to the pivoting motion of the strikers 81. Then, the pivoting motion of the strikers 81 continues even after the push-up by the first push-up portions 86 is finished, and the second push-up portions 87 come into contact with the lower surface of the lid 30 to apply a push-up force to the lower surface. The lid 30 continues to be pushed up by the push-up force of the second push-up portions 87. The pivoting motion of each of the front and rear strikers 81 is stopped when the striker 81 comes into contact with the second wall portion 19 (refer to FIG. 16B). The upper portion of the lid 30 protrudes upward from the box main body 11.

Also at this time, the push-up force of the second push-up portions 87 acts on the lower surface of the lid 30. However, the time during which the push-up force acts in this case is shorter than in a case in which the push-up force always acts on the lower surface of the lid 30 when the upper opening 14 is closed by the lid 30. Therefore, the lower surface of the lid 30 is unlikely to be dented.

When the lid 30 is unlocked so that the operation portions 65 are no longer pressed inward, the operation portions 65 are moved outward in the left-right direction together with the pivot shafts 54 by the urging force of the left and right first springs 68, as shown in FIG. 11. An outer portion in the left-right direction of each operation portion 65 protrudes outward in the left-right direction from the gate portion 62 of the operation base 61.

In the front and rear support wall portions 21, the shims 70 are moved inward in the front-rear direction by the urging force of the second springs 74. The above-described movement of each shim 70 is restricted by each hook 72 being engaged with a peripheral portion of the corresponding engagement hole 24 in the shim accommodating portion 22.

<Case in which Lid 30 is Attached to Box Main Body 11>

When the lid 30 is attached to the box main body 11 in a state in which the vertical positional relationship between the first surface 34 and the second surface 41 is reversed, the lid 30 is pressed against the box main body 11 from above.

At this time, the front and rear pin portions 56 of the left and right pivot shafts 54 come into contact with the outer inclined surfaces 76 of the front and rear shims 70. As shown in FIG. 5, the outer inclined surface 76 of each shim 70 is inclined such that the outer inclined surface 76 extends downward as the outer inclined surface 76 extends toward the inner side in the front-rear direction. Therefore, each of the shims 70 is pressed against the urging force of the second spring 74 and moves outward in the front-rear direction. The moving direction of the shim 70 at this time is a direction away from the pivot shaft 54 in the front-rear direction. When the pin portion 56 of each pivot shaft 54 passes the outer inclined surface 76 and descends to the center portion of the shim 70, the shim 70, urged by the second spring 74, moves inward in the front-rear direction. When the front and rear pin portions 56 of each pivot shaft 54 enter the receiving recesses 75 of the shims 70, the pivot shaft 54 is coupled to the box main body 11.

At this time, each of the front and rear push-up mechanisms 80 perform actions in reverse order of those in the section <When both operation portions 65 are pressed inward simultaneously>. That is, although not illustrated, as the lid 30 descends, the lower surface (the second surface 41) of the lid 30 first comes into contact with the second push-up portion 87 of each striker 81 (refer to FIG. 16B). As the lid 30 descends, a push-down force acts on the second push-up portion 87 of each striker 81. The push-down force pivots each striker 81 in a direction opposite to the urged pivoting direction (refer to FIG. 16A). In the course of this pivoting motion, the first push-up portion 86 of each striker 81 enters the lower recess 51 while contacting the inner wall surface 52 of the lower recess 51 (refer to FIG. 15B). Also, the second push-up portion 87 moves downward away from the lower surface of the lid 30 (FIG. 15A). When the lid 30 is lowered to the closing position, a large part of the first push-up portion 86 enters the recess 51. In this state, the push-up force by the push-up mechanisms 80 acts on the lid 30 through the first push-up portions 86.

Accordingly, the lid 30 closes the upper opening 14 while being turned upside down, so that the first surface 34, which was the lower surface before the lid 30 was unlocked, faces upward, as shown in FIG. 10. The upward facing first surface 34 has no or only inconspicuous dent caused by push-up actions.

The present embodiment has the following advantages.

(1) In the present embodiment, the lid 30 is detachably coupled to the box main body 11. Also, the box main body 11 and the lid 30 have shapes that allow the lid 30 to be removed from and coupled to the box main body 11 regardless of which of the first surface 34 and the second surface 41 is facing upward. This allows the lid 30 to be attached to the box main body 11 regardless of which of the first surface 34 and the second surface 41 is facing upward.

(2) In the present embodiment, when one of the two operation portions 65 is pushed inward, the box main body 11 and the pivot shaft 54 that corresponds to that operation portion 65 are decoupled from each other. This allows the lid 30 to pivot about the pivot shaft 54 corresponding to the operation portion 65 that is not pressed inward and is coupled to the box main body 11.

At this time, the lid 30 can be pushed up from the box main body 11 by the push-up force of the two push-up mechanisms 80. By holding a portion of the lid 30 that protrudes from the box main body 11, the lid 30 can be easily pivoted about the pivot shaft 54 to open and close the upper opening 14. The lid 30 is thus easy to operate.

Also, a situation is prevented from occurring in which, after one of the operating portions 65 stops being pressed inward, the lid 30 cannot be pivoted because the pivot shaft 54 corresponding to that operation portion 65 is coupled to the box main body 11.

(3) In the present embodiment, the two pivot shafts 54 and the box main body 11 are decoupled from each other by simultaneously pressing the two operation portions 65 inward. This allows the lid 30 to be removed from the box main body 11.

At this time, the lid 30 can be pushed up from the box main body 11 by the push-up force of the push-up mechanisms 80. By holding a portion of the lid 30 that protrudes from the box main body 11, the lid 30 can be easily removed from the box main body 11.

Also, a situation is prevented from occurring in which, after the operating portions 65 stop being pressed inward, the lid 30 cannot be removed because the pivot shafts 54 are coupled to the box main body 11.

(4) In the present embodiment, in the closed state of the upper opening 14, the push-up force by the first push-up portion 86 of each striker 81 is applied to the inner wall surface 52 of the recess 51 opened in the side surface of the lid 30 as shown in FIG. 15A. At this time, the second push-up portion 87 of each striker 81 is separated downward from the lower surface of the lid 30, so that the push-up force of the strikers 81 does not act on the lower surface of the lid 30.

When the closed upper opening 14 is opened or when the lid 30 is removed, the lid 30 is pushed up by the first push-up portion 86 of each striker 81. Further, the lid 30 is pushed up by the second push-up portion 87 after each striker 81 pivots so that the push-up force by the first push-up portion 86 ceases to act.

Therefore, when closing the upper opening 14 with the lid 30, the first surface 34, which is formed by the outer layer 37 softer than the strikers 81, may be the lower surface. Even in this case, a dent is not formed in the front and rear central portions 34c of the first surface 34 by the push-up force of the strikers 81.

Therefore, when the lid 30 is attached to the box main body 11 to close the upper opening 14 such that the first surface 34, which was the lower surface before the lid 30 was unlocked by the lock mechanisms 60, the upward facing first surface 34 has no or only inconspicuous dent caused by push-up actions. As a result, the appearance of the lid 30 is improved as compared with a case in which push-up force is always applied to the lower surface (the central portion 34c) of the lid 30 when the upper opening 14 is closed with the lid 30.

(5) In the present embodiment, each striker 81 includes the first push-up portion 86, which moves into and out of the recess 51 as the striker 81 pivots about the shafts 82, 83, and the second push-up portion 87, which moves toward and away from the lower surface of the lid 30 from below as the striker 81 pivots.

Therefore, if the recesses 51 are opened at the central portion in the thickness direction in the side surface of the lid 30, the first push-up portion 86 is separated from the second push-up portion 87, and the size of the striker 81 may be increased.

In this regard, in the present embodiment, as shown in FIG. 15A, the recesses 51 are opened at two positions in the side surface of the lid 30, and the positions are separated in opposite directions from the central portion in the thickness direction by an equal distance. The first push-up portion 86 is moved into and out of the recess 51 located on the lower side. Therefore, the first push-up portion 86 is located at a position close to the second push-up portion 87, so that the size of each striker 81 is reduced.

(6) In the present embodiment, the push-up mechanisms 80 are disposed on the opposite sides of the upper opening 14 in the front-rear direction, which is the direction in which the first sides 15 extend. With this arrangement, the lid 30 is pushed up by the two push-up mechanisms 80 on the opposite sides in the front-rear direction of the upper opening 14.

Therefore, compared to a case in which a push-up action is performed on one side in the front-rear direction of the upper opening 14, a force for pushing up the lid 30 can be applied to the lid 30 in a well-balanced manner in the front-rear direction.

(7) When the lid 30 is attached to the box main body 11 with the first surface 34 of the lid main body 31 facing upward, the first surface 34 functions as a place on which an elbow is rested. That is, the lid 30 can be used as an armrest.

Also, when the lid 30 is attached to the box main body 11 with the second surface 41 of the lid main body 31 facing upward, the second surface 41 functions as a tray surface. That is, the lid 30 can be used as a tray by placing articles on the tray surface.

(8) In the present embodiment, the front and rear pinions 55 of each pivot shaft 54 are meshed with the racks 45 of the front wall portion 43 and the rear wall portion 44, as shown in FIG. 8. Each pinion 55 rolls on the rack 45 when the lock mechanism 60 locks and unlocks the lid 30. This prevents the pivot shafts 54 from moving in the left-right direction while being inclined with respect to the front-rear direction. When the lid 30 is locked and unlocked, each pivot shaft 54 is smoothly moved in the left-right direction while being maintained to be parallel to the first sides 15 (the first wall portions 18).

The above-described embodiment may be modified as follows. The above-described embodiment and the following modifications can be combined as long as the combined modifications remain technically consistent with each other.
<Modifications to Upper Opening 14>

The shape of the upper opening 14 may be changed to a shape different from the one in the above-described embodiment as long as the shape is a rectangular shape.

The shape of the upper opening 14 may be changed to a shape different from a rectangular shape.

In the above-described embodiment, the second sides 16 may be longer than the first sides 15.
<Modifications to Lid 30>

The recesses 51 may be opened at a central portion in the thickness direction in the side surface (the supporting plate portion 46) of the lid 30.

The second half body 39 may have the same layer structure as the first half body 33. That is, the second half body 39 may include a base member, which is made of a hard plastic, a cushion layer, which is stacked on the base member and made of foam, and an outer layer, which is stacked on the cushion layer.

At least one of the first half body 33 and the second half body 39 may include a base member, which is made of a hard plastic, and an outer layer, which is stacked on the base member.

A portion of the lid 30 that includes at least one of the surfaces in the thickness direction may formed by a layer different from the outer layer 37 as long as that layer is softer than the striker 81. The layer may be a coating film.

The second half body 39 may include one recess 40 (refer to FIGS. 14 and 15A). Alternatively, the second half body 39 include two or more recesses 40. Furthermore, the recess 40 may be omitted from the second half body 39.
<Modifications to Pivot Shafts 54>

The two pivot shafts 54 may be disposed to extend in the left-right direction, instead of the front-rear direction.

One of the pivot shafts 54 can be omitted. In this case, the lock mechanism 60 corresponding to the pivot shaft 54 to be omitted is also omitted.
<Modifications to Push-Up Mechanisms 80>

The two push-up mechanisms 80 may be disposed on opposite sides of the upper opening 14 in the direction along the second sides 16, instead of the first sides 15.

The number of the push-up mechanisms 80 may be changed to one or greater than two.

As the third spring 84, which urges the striker 81 in the urged pivoting direction in which the lid 30 is pushed up, a spring of a type different from the torsion coil spring may be used.

As the urging member that urges the striker 81 in the urged pivoting direction in which the lid 30 is pushed up, a member different from a spring may be used.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A console box, comprising:
   a box main body that includes an accommodation portion provided with an upper opening;
   a lid that is detachably coupled to the box main body, and opens and closes the upper opening;
   a lock mechanism that locks the lid in a state in which the lid closes the upper opening; and
   at least one push-up mechanism that pushes up the lid from the box main body in response to unlocking of the lid by the lock mechanism, wherein
   the box main body and the lid have shapes that allow the lid to be detached from and coupled to the box main body regardless of which one of surfaces in a thickness direction of the lid faces upward,
   the push-up mechanism includes:
     at least one recess that opens in a side surface of the lid;
     a striker pivotally supported by the box main body with a shaft; and
     an urging member that urges the striker in an urged pivoting direction in which the lid is pushed up,
   a portion of the lid that includes at least one of the surfaces in the thickness direction is formed to be softer than the striker, and
   the striker includes:
     a first push-up portion that enters the recess in a closed state in which the upper opening is closed by the lid, is removed from the recess as the lid is raised, and applies a push-up force to an inner wall surface of the recess when the first push-up portion is inside the recess; and a second push-up portion that is located on a trailing side in the urged pivoting direction of the first push-up portion, is separated downward from a lower surface of the lid in the closed state, and is brought into contact with the lower surface to apply a push-up force to the lower surface after a push-up action by the first push-up portion.

2. The console box according to claim 1, wherein
the at least one recess includes two recesses opened at two positions on the side surface of the lid, the two positions being separated from a central portion in the thickness direction by an equal distance in opposite directions in the thickness direction, and
the striker is disposed at a position at which the first push-up portion is inside the lower recess in the closed state of the upper opening, in which the upper opening is closed by the lid.

3. The console box according to claim 1, wherein
the upper opening has a rectangular shape having two first sides and two second sides orthogonal to the first sides, and
the at least one push-up mechanism includes two push-up mechanisms disposed on opposite sides of the upper opening in a direction in which the first sides or the second sides extend.

4. The console box according to claim 1, wherein the portion of the lid that is formed to be softer than the striker is formed by an outer layer.

5. The console box according to claim 1, wherein
the lid includes:
a lid main body;
two pivot shafts that extend in a direction orthogonal to a width direction of the lid main body on opposite sides in the width direction of the lid main body, and couples the lid main body to the box main body; and
two operation portions that are provided as members forming a part of the lock mechanism to respectively correspond to the two pivot shafts and are operated to decouple the pivot shafts and the box main body from each other, the operation portions being independent from each other,
the lid is configured to, when one of the two operation portions is operated, be pivotal about the pivot shaft that corresponds to the unoperated operation portion and is coupled to the box main body, and
the lid is configured to, when both of the two operation portions are operated simultaneously, be removable from the box main body.

* * * * *